(12) United States Patent
Court et al.

(10) Patent No.: US 8,021,072 B2
(45) Date of Patent: Sep. 20, 2011

(54) MOUNTING ASSEMBLY

(75) Inventors: David Court, Somerset (GB); Andrew Robert Slayne, Bristol (GB)

(73) Assignee: Saint-Gobain Performance Plastics Rencol Limited, Bristol (GB)

( * ) Notice: Subject to any disclaimer, the term of this patent is extended or adjusted under 35 U.S.C. 154(b) by 306 days.

(21) Appl. No.: 12/104,554

(22) Filed: Apr. 17, 2008

(65) Prior Publication Data

US 2008/0267693 A1    Oct. 30, 2008

Related U.S. Application Data

(60) Provisional application No. 60/913,748, filed on Apr. 24, 2007.

(51) Int. Cl.
*F16C 27/00* (2006.01)
*G11B 5/55* (2006.01)

(52) U.S. Cl. ............... 403/372; 360/265.2; 384/535

(58) Field of Classification Search ........... 403/367, 403/371, 372; 411/520, 521; 384/535, 581; 360/97.02, 265.2, 265.6, 266.1
See application file for complete search history.

(56) References Cited

U.S. PATENT DOCUMENTS

| | | | | |
|---|---|---|---|---|
| 2,886,354 A * | 5/1959 | Bjorklund | | 403/372 |
| 3,061,386 A * | 10/1962 | Dix et al. | | 384/535 |
| 3,142,887 A * | 8/1964 | Hulck et al. | | 29/898.06 |
| 3,494,676 A * | 2/1970 | Compton | | 384/222 |
| 3,700,271 A * | 10/1972 | Blaurock et al. | | 403/372 |
| 3,838,928 A * | 10/1974 | Blaurock et al. | | 403/372 |
| 4,286,894 A * | 9/1981 | Rongley | | 403/372 |
| 4,376,254 A * | 3/1983 | Hellmann | | 310/235 |
| 4,790,683 A * | 12/1988 | Cramer et al. | | 403/372 |
| 4,828,423 A * | 5/1989 | Cramer et al. | | 403/372 |
| 4,981,390 A * | 1/1991 | Cramer et al. | | 403/371 |
| 6,261,061 B1 | 7/2001 | Pfaffenberger | | |
| 6,288,878 B1 * | 9/2001 | Misso et al. | | 360/264.3 |
| 6,411,472 B1 * | 6/2002 | Allsup | | 360/265.7 |
| 6,480,363 B1 * | 11/2002 | Prater | | 360/265.7 |
| 7,554,771 B2 * | 6/2009 | Hanrahan et al. | | 360/265.2 |
| 7,580,225 B2 * | 8/2009 | Hanrahan et al. | | 360/265.6 |
| 2002/0039461 A1 * | 4/2002 | Obara et al. | | 384/535 |
| 2005/0225903 A1 * | 10/2005 | Sprankle et al. | | 360/264.3 |
| 2006/0181811 A1 * | 8/2006 | Hanrahan et al. | | 360/265.2 |
| 2006/0275076 A1 | 12/2006 | Hanrahan et al. | | |
| 2007/0096572 A1 * | 5/2007 | Watkins et al. | | 310/90 |
| 2007/0291417 A1 * | 12/2007 | Woodhead et al. | | 360/265.2 |
| 2008/0043374 A1 * | 2/2008 | Hanrahan et al. | | 360/265.6 |
| 2008/0043375 A1 * | 2/2008 | Hanrahan et al. | | 360/265.6 |

\* cited by examiner

*Primary Examiner* — Joshua Kennedy
(74) *Attorney, Agent, or Firm* — Abel Law Group, LLP; Chi Suk Kim

(57) ABSTRACT

A tolerance ring (10) for providing an interference fit between inner and outer components (36, 50). The tolerance ring (10) comprises a deformable band having a plurality of radially extending projections around its circumference. The projections include a set of axially spaced protuberances (12, 13) separated by an unformed region (11) circumferentially adjacent to an axially elongate protuberance (15), the axial extent of which spans the axial extent of the set of axially spaced protuberances. This arrangement of protuberances facilitates the transfer of retention force to a component that is composed of a plurality of independent parts, e.g. two or more bearings (54, 56) separated by a spacer (58).

6 Claims, 5 Drawing Sheets

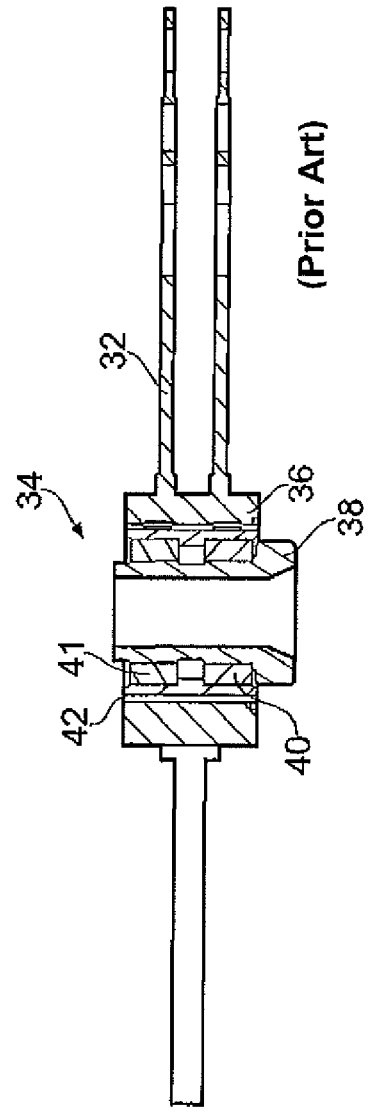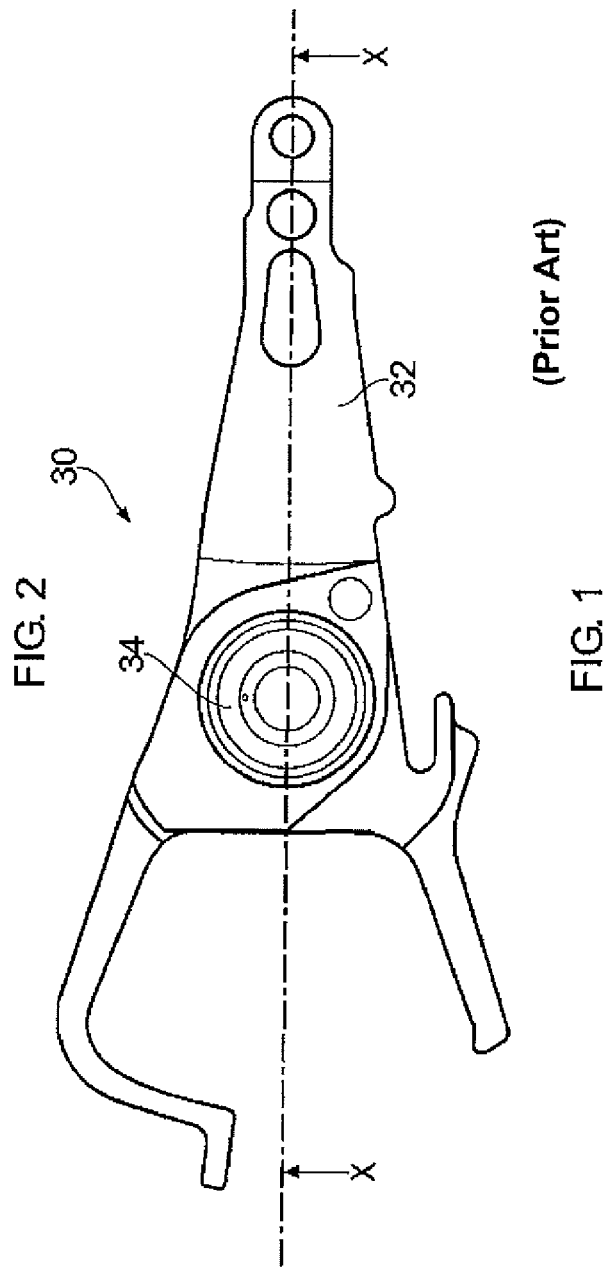

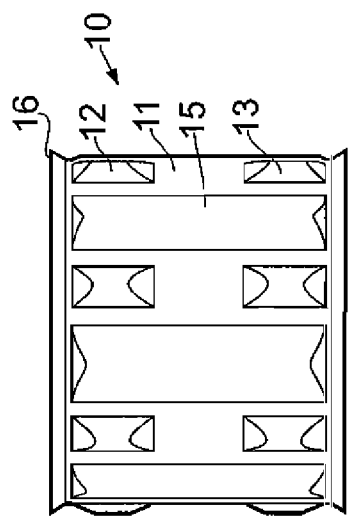
FIG. 5
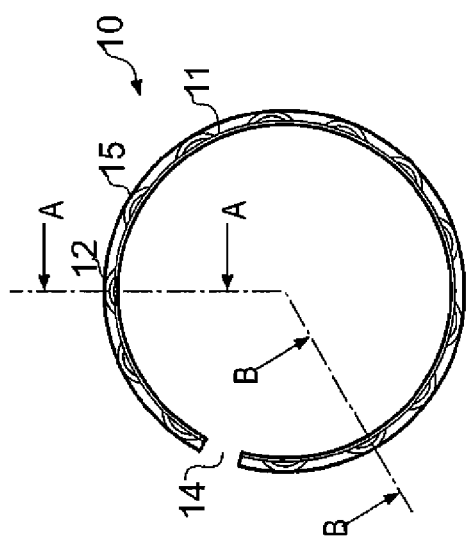
FIG. 6(a)
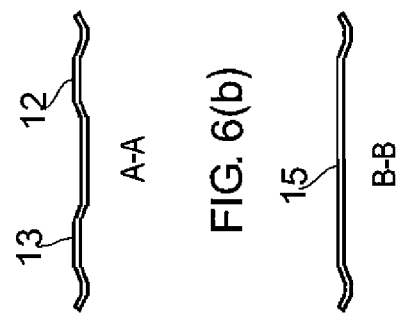
FIG. 6(b)
FIG. 6(c)

MOUNTING ASSEMBLY

FIELD OF THE INVENTION

The invention relates to apparatus comprising mating inner and outer components, which are mounted together using a tolerance ring. For example, the invention can be used for mounting an arm on a bearing to form a pivot.

BACKGROUND OF THE INVENTION

It is known to connect together mating inner and outer components using a tolerance ring. For example, a tolerance ring may be sandwiched between a shaft that is located in a corresponding bore formed in a housing, or it may act as a force limiter to permit torque to be transmitted between the shaft and the housing. The use of a tolerance ring accommodates minor variations in the diameter of the inner and outer components without substantially effecting their interconnection.

Typically, a tolerance ring comprises a band of resilient material, e.g. a metal such as spring steel, the ends of which are brought towards one another to form a ring. A strip of projections extends radially from the ring either outwardly or inwardly towards the centre of the ring. The projections can be formations, possibly regular formations, such as corrugations, ridges, waves or fingers. The band thus comprises an unformed region from which the projections extend, e.g. in a radial direction.

In use, the tolerance ring is located between the components, e.g. in the annular space between the shaft and bore in the housing, such that the projections are compressed between the inner and outer components. Each projection acts as a spring and exerts a radial force against the components, thereby providing an interference fit between them. Rotation of the inner or outer component will produce similar rotation in the other component as torque is transmitted by the ring. Likewise, linear movement of either component will produce similar linear movement in the outer component as linear force is transmitted by the ring.

If forces (rotational or linear) are applied to one or both of the inner and outer components such that the resultant force between the components is above a threshold value, the inner and outer components can move relative to one another, i.e. the tolerance ring permits them to slip.

Although tolerance rings usually comprise a strip of resilient material that is curved to allow the easy formation of a ring, e.g. by overlapping the ends of the strip, they may also be manufactured as an annular band.

During assembly of apparatus with an interference fit between components, a tolerance ring is typically held stationary with respect to a first (inner or outer) component whilst a second component is moved into mating engagement with the first component, thereby contacting and compressing the projections of the tolerance ring to provide the interference fit. The amount of force required to assemble the apparatus may depend on the stiffness of the projections and the degree of compression required. Likewise, the load transmitted by the tolerance ring in its final position and hence the amount of retention force provided or torque that can be transmitted may also depend on the size of the compression force and the stiffness and/or configuration of the projections.

One example of the use of a tolerance ring is in a hard disk drive (HDD) pivot mount, where the tolerance ring provides axial retention between a rotatable pivot shaft and an arm mounted thereon. In conventional pivot mounts, the tolerance ring provides an interference fit between the arm and a bearing mounted on the shaft. Typically the bearing comprises two pairs of races which are axially separated from each other by a spacer. Since the components in pivot mounts are very small and sensitive, the bearing is often protected by a surrounding sleeve (a "sleeved pivot"). The sleeve often has the spacer machined on its inner surface. In such arrangements the tolerance ring is sandwiched between the sleeve and the arm. Whilst sleeved pivots are less prone to damage and therefore are less likely to adversely affect hard disk drive performance, the precise machining required to form the spacer on the inner surface of the sleeve and the desire to use less material in the manufacture of pivot mounts has led to the introduction of sleeveless pivots.

In sleeveless pivots, the outer race of each part of races is exposed, and the spacer comprises an annular band located axially ("floating") between them. The spacer is held in place by an axial pre-loading force exerted on the bearing. In such arrangements the tolerance ring is located between the outer races of the bearing and the arm.

SUMMARY OF THE INVENTION

At its most general, the invention provides a tolerance ring configuration which can confer greater stability on a sleeveless pivot. Stability between the two pairs of races and spacer is desirable to provide consistent performance of the pivot. The configuration of the invention may act to balance the force exerted by the tolerance ring across the outer surface of the pivot. By balancing the forces experienced by the axially separated outer races of the bearing, the inner and outer races of each pair of races can be kept substantially parallel with each other, which permits consistent performance and can reduce any effect on pivot torque associated with fixing the pivot in an assembly.

According to a first aspect of the invention, there may be provided a tolerance ring for providing an interference fit between an inner component and an outer component, the tolerance ring comprising a deformable band having a plurality of radially extending projections around its circumference, wherein the projections include a set of axially spaced protuberances circumferentially adjacent to an axially elongate protuberance, the axial extent of which spans the axial extent of the set of axially spaced protuberances. The radial projections may extend inwardly or outwardly with respect to the band.

In use, the axially elongate protuberance can act to balance a retention force of the tolerance ring along an axial direction of the inner or outer component. Thus, if the inner (or outer) component comprises a plurality of independent parts arranged axially, the axially elongate protuberance can spread the retention force between the independent parts.

The set of axially spaced protuberances may be arranged in use to more precisely target locations on the inner and/or outer components where the retention force is to act. The set of axially spaced protuberances may comprise a column of two or more protuberances that are aligned in the axial direction. The protuberances may be discrete. They may have identical shapes. Where the inner (or outer) component comprises a plurality of independent parts arranged axially, each of the set of axially spaced protuberances may be arranged to transmit the retention force to a respective one of the independent parts. For example, the independent parts may include bearings; each protuberance may act on the outer race of a respective bearing.

The axial length of the axially elongate protuberance may correspond to the axial extent of the set of spaced protuberances. In one embodiment, the outermost axial edges of the axially elongate protuberance may lie on a common circumference with the outermost axial edges of the set of axially spaced protuberances. This can ensure that any force acting along these edges is aligned around the circumference of the inner and/or outer component.

There may be a plurality of axially elongate protuberances located at angular intervals around the circumference of the tolerance ring. The angular intervals may be regular e.g. to provide a rotationally symmetric configuration of elongate protuberances.

In one embodiment there are three axially elongate protuberances substantially equally spaced around the tolerance ring circumference. Having three points of spread contact with the inner and/or outer component can make the tolerance ring very stable when mounted.

There may be a plurality of sets of axially spaced protuberances. Where there is also more than one elongate protuberances, the sets may alternate with the elongate protuberances or there may be two or more sets in between a pair of elongate protuberances. The protuberances of each set may be circumferentially aligned with corresponding protuberances in other sets to create an even effect around the tolerance ring. Thus, the sets of protuberances may provide two or more circumferential series of projections, each series being axially spaced from and independent of the others. The projections in each series may be evenly spaced around the circumference of the tolerance ring.

In one embodiment, there are a pair of waves in each set of protuberances.

Each projection may comprise a rounded ridge, e.g. a wave, which rises to and falls from a radial peak. In such a case, the force transmitted by the projection is concentrated around the edges where it meets the band (its "footprint"). Thus, by locating each of the set of protuberances over a particular location, the force transmitting by those protuberances can be targeted whereas the elongate protuberance can spread its transmitted force over a wider axial extent. The invention can therefore achieve both force targeting and force balancing.

The band may be a resilient split ring, e.g. an open loop of material extending partly around the perimeter of the inner component. The configuration of projection may be symmetrical around the circumference of the ring with respect to the split. This arrangement may be particularly stable.

The inner and outer components may comprise a shaft that is receivable in a bore formed in a housing. The bore may extend fully through the housing or only extend partially through or into the housing. In one embodiment, the housing may be an arm for a hard disk drive and the shaft may be a pivot for that arm. The pivot may comprise a pair of bearings which are separated from each other by a spacer element. The spacer element and bearings may be arranged substantially contiguously to form the outer surface for receiving the tolerance ring.

Each member of the set of protuberances may be arranged to transmit force to an outer race of a respective bearing, whilst the axially elongate protuberance is arranged to contact (i.e. transmit force to) the outer races of both bearings and the spacer element. Thus, the force footprint of each member of the set of protuberances is focussed wholly on an outer race of a respective bearing whereas the force footprint of the axially elongate protuberance bridges across the components (e.g. bearings and spacer element) of the pivot.

According to a second aspect of the invention, there may be provided apparatus comprising an inner component, an outer component which mates with the inner component, and a tolerance ring located between the inner and outer components, the tolerance ring comprising a band having a plurality of radially extending projections around its circumference which are compressible between the inner and outer components, wherein the projections include a set of axially spaced protuberances circumferentially adjacent to an axially elongate protuberance, the axial extent of which corresponds to the axial extend of the set of axially spaced protuberances. The inner component may be composed of a plurality of axially adjacent sub-components. Each member of the set of axially spaced protuberances may be arranged to contact a respective subcomponent whilst the axially elongate protuberance may contact a plurality of the sub-components. For example, the inner component may be a pivot for a HDD pivot mount, as discussed above.

Further aspects of the invention may include a method of assembling the apparatus according to the second aspect, and a pre-assembly comprising a tolerance ring according to the first aspect securely mounted on a shaft or within the bore of a housing.

BRIEF DESCRIPTION OF THE DRAWINGS

An embodiment of the invention is described below with reference to the accompanying drawings, in which:

FIG. 1 shows a plan view of a conventional HDD pivot mount which includes a tolerance ring;

FIG. 2 shows a cross-section taken along the line X-X of the HDD pivot mount shown in FIG. 1;

FIG. 5 shows a side view of the tolerance ring shown in FIG. 4;

FIG. 6(a) shows a plan view of the tolerance ring shown in FIG. 4, FIGS. 6(b) and 6(c) show cross-sections taken along the lines A-A and B-B respectively;

DETAILED DESCRIPTION; FURTHER OPTIONS AND PREFERENCES

Figure 3:
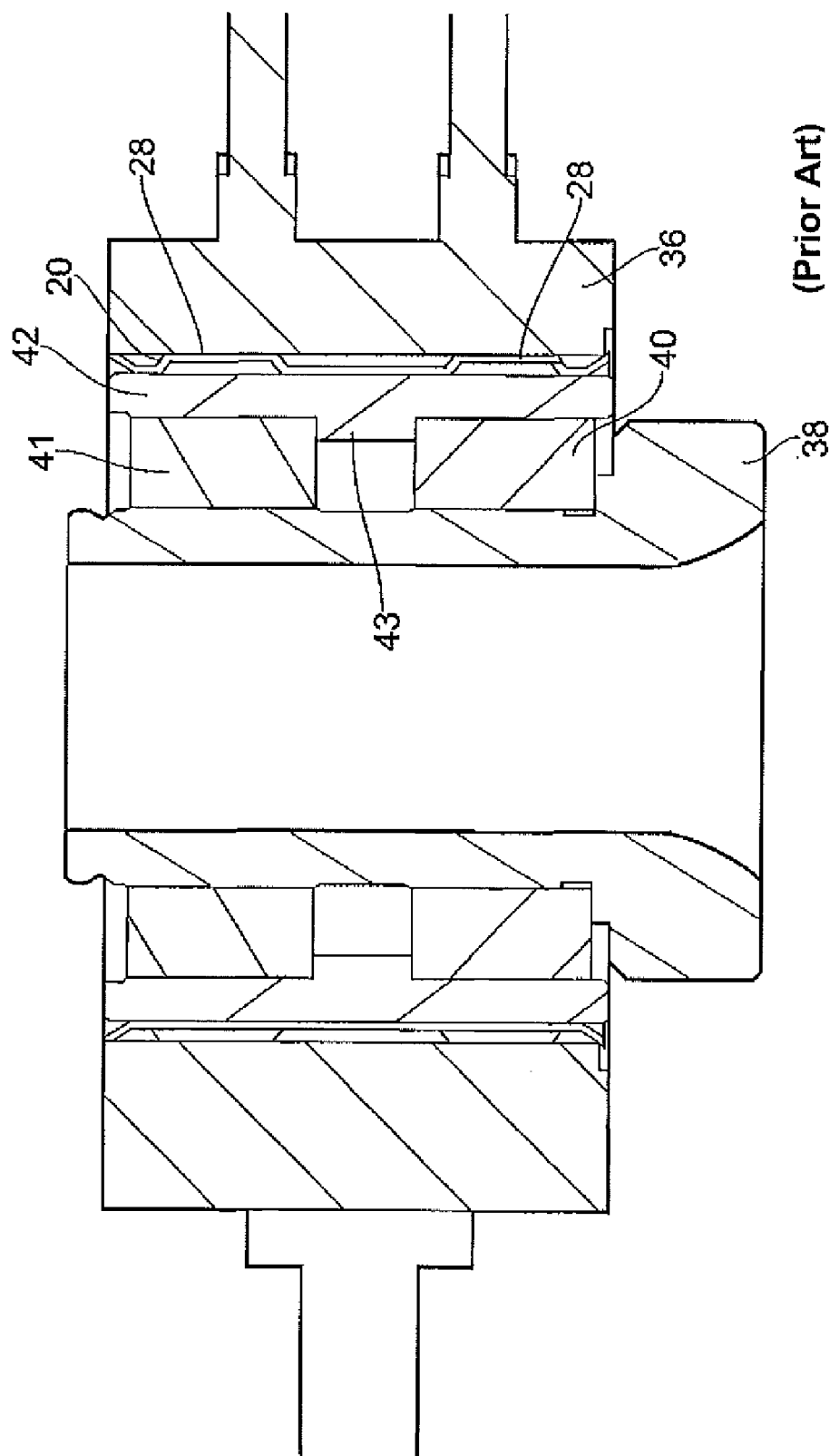
FIG. 3 shows a close-up of the coupling between the arm and sleeved pivot of the HDD pivot mount shown in FIG. 1.

FIG. 1 shows a known HDD pivot mount 30, which comprises an arm 32 adapted to retain magnetic recording disks and pivot 34 which is rotatable on a bearing about a shaft. A tolerance ring (not shown in FIG. 1) provides an interference fit between the pivot 34 and the arm 32 such that the arm rotates with the pivot.

FIG. 2 shows a cross-section taken along the line X-X in FIG. 1. FIG. 2 shows that the arm 32 comprises a circumferential housing 36 which includes a bore in which the pivot 34 is received. The pivot 34 comprises a rotatable sleeve member 42 which is coupled to a shaft 38 via a pair of bearings 40, 41. FIG. 2 thus shows an example of a sleeved pivot. The tolerance ring fits between the outer surface of the rotatable sleeve member 42 and the inner surface of the bore formed in the circumferential housing 36. This is shown in more detail in FIG. 3, where it can be seen that a tolerance ring 20 having waves 28 substantially aligned with bearings 40, 41 is compressed between the rotatable sleeve member 42 and circumferential housing 36.

In FIG. 3 it can be seen that rotatable sleeve member 42 comprises an integral spacer element 43 which separates the bearings 40, 41.

Figure 4:
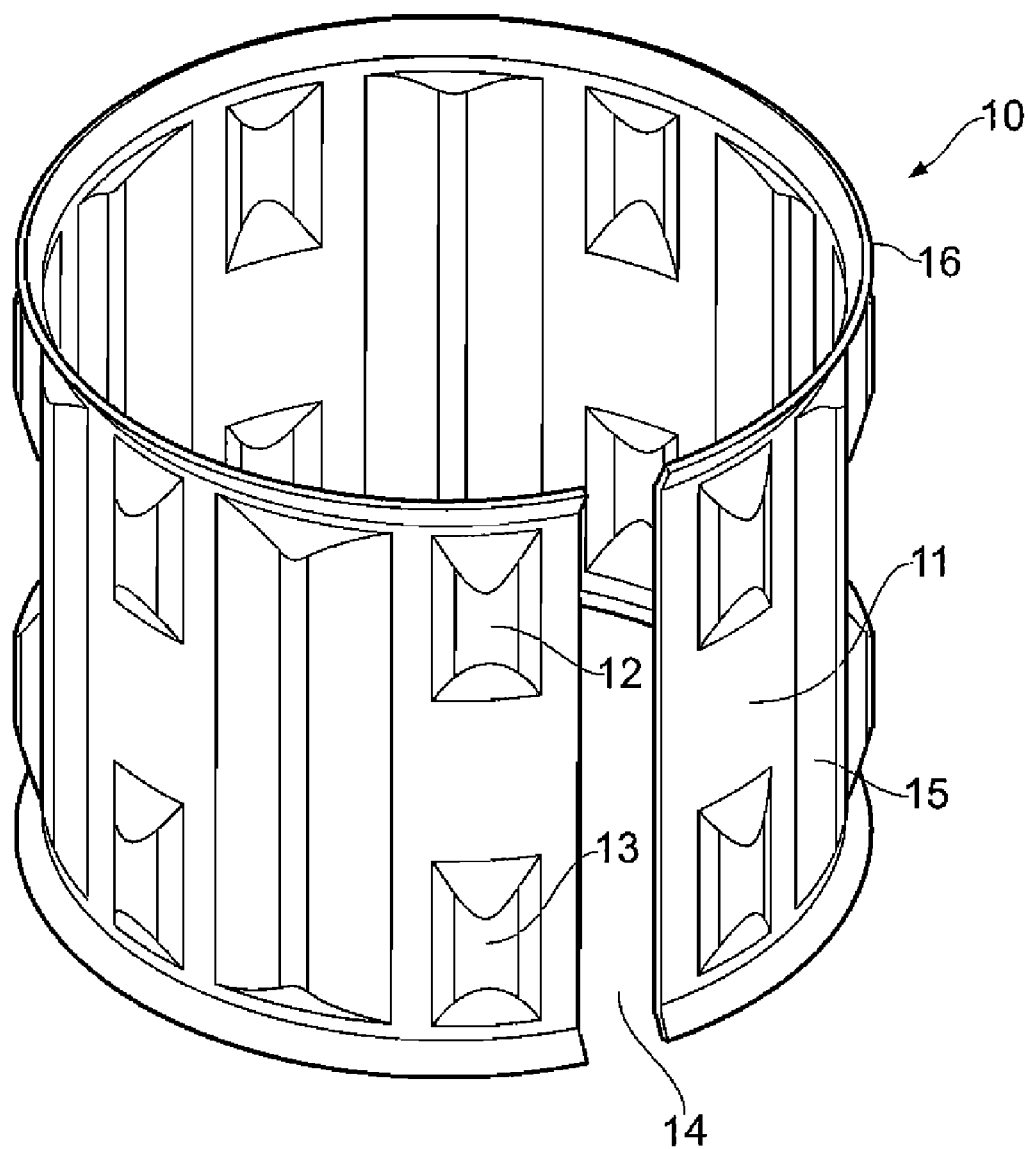
FIG. 4 shows a perspective view of a tolerance ring that is an embodiment of the invention.

FIG. 4 shows a tolerance ring 10 which is an embodiment of the invention. It is suitable for use with a sleeveless pivot, i.e. a pivot without a rotatable sleeve member wherein the outer races of the bearings are exposed to and contact the tolerance ring. The tolerance ring 10 comprises an annular band 11 of resilient material, e.g. spring (e.g. non-carbon) steel, which can be formed by deforming a rectangular piece of material. The tolerance ring 10 may be sized for delicate assemblies, e.g. have a diameter of less than 16 mm and a thickness of less than 0.2 mm.

The band 11 has an axial split 14, i.e. its two circumferential edges do not meet. The tolerance ring 10 is therefore able to open radially when a shaft (inner component) is inserted along its axis. A outwardly flared flange 16 is provided around the top edge of the band 11 as a guide for an inserted shaft.

The band 11 includes a plurality of outwardly protruding waves 12, 13, 15 which act as radially extending projections. The waves 12, 13, 15 are compressible to provide an interference fit between inner and outer components (e.g. pivot and circumferential housing respectively in the example given above). Each wave 12, 13, 15 comprises a circumferentially extending rounded ridge rising to and falling from a radial peak. Each wave 12, 13, 15 tapers up to the peak from its axial edges.

The waves 12, 13, 15 form two types. The first type have a similar configuration to conventional waves. In the embodiment shown in FIG. 4, waves 12, 13 are examples of the first type. Waves 12, 13 act as a set of axially spaced protuberances; in the embodiment shown in FIG. 4 there are a plurality of such sets spaced at equal angular intervals around the band 11. There are two identical waves located in the same axial column in each set (a "duplex" wave). Wave 15 is an example of the second type. It acts as an axially extending protuberance whose axial extent corresponds to the axial extent of the set of axially spaced waves 12, 13.

Thus, wave 15 protrudes at an axial position on the band which corresponds to a gap between the axially spaced waves 12, 13. Moreover, the axial edges of the elongate wave 15 are aligned with the outer edges of the waves 12, 13 in the set of axially spaced waves.

In the embodiment there are a plurality of elongate waves 15 and sets of duplex waves 12, 13 located alternately around the circumference of the band 11. The configuration is arranged so that a duplex wave 12, 13 is located adjacent each edge of the split 14. This provides symmetry to the configuration of projections which can make the tolerance ring more stable in use.

Further views of the embodiment are shown in FIGS. 5, 6(a), 6(b) and 6(c). FIG. 5 shows a side view, whilst FIGS. 6(a), 6(b) and 6(c) shows the cross-section shapes of the waves 12, 13, 15.

Figure 7A:
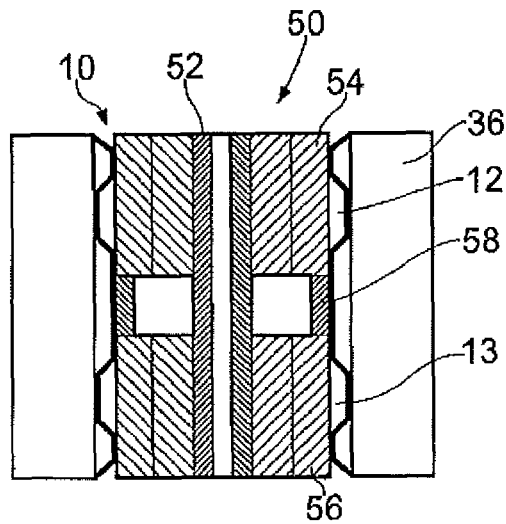
FIG. 7(a) is a first cross-section through a HDD pivot mount having a sleeveless pivot which is another embodiment of the invention.
Figure 7B:
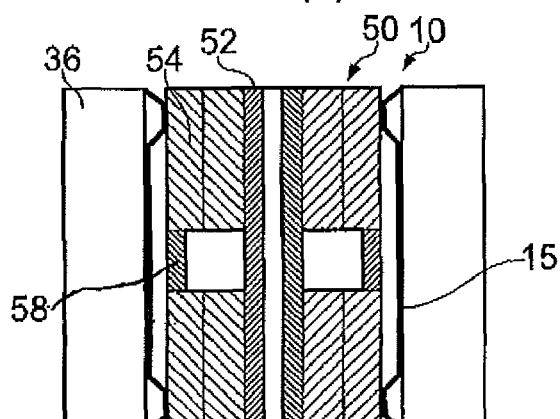
FIG. 7(b) is a second cross-section through the HDD pivot mount shown in FIG. 7(a)

FIGS. 7(a) and 7(b) show cross-sectional views through apparatus where the tolerance ring 10 is in use between a sleeveless pivot 50 and the circumferential housing 36 of an outer component e.g. an arm for a HDD pivot mount. The sleeveless pivot comprises a hollow central shaft 52 with a pair of bearings 54, 56 attached thereto. The bearings 54, 56 are axially separated by an annular spacer element 58. The pivot 50 has no sleeve, so the outer race of each bearing 54, 56 and the spacer element 58 form the outer surface of the pivot. These components are not attached to one another; they "float" in position under a pre-loading axial force that was applied to the inner race of the bearings 54, 56 when they were attached to the shaft 52. The tolerance ring provides an interference fit by contacting the outer surface of the pivot and the inner surface of the circumferential housing 36.

FIG. 7(a) shows a cross-section through the apparatus at a point where there are two diametrically opposed duplex waves 12, 13. Each wave 12, 13 is substantially aligned with the outer races of a respective bearing 54, 56 to transmit its force to that bearings.

It is important to transmit force to the bearing for stable operation and to decrease pivot torque. On the other hand since the bearings 54, 56 and spacer element 58 are floating there is a risk that the transmitted forces may be unbalanced. FIG. 7(b) shows a cross-section through the apparatus at a point where there are two diametrically opposing bridging waves 15. The force transmitted by the bridging wave 15 spans across the three components 54, 56, 58 and therefore can balance the forces acting on the pivot 50.

Figure 8:
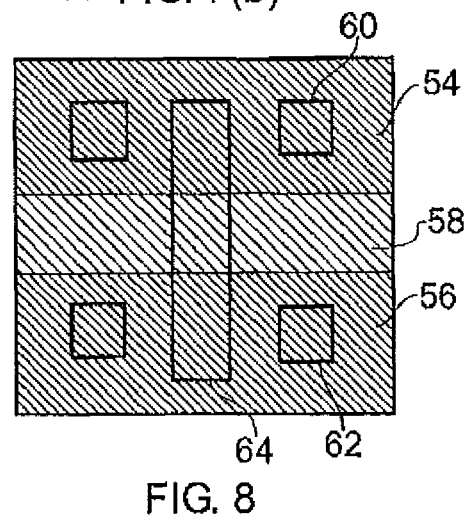
FIG. 8 is a schematic representation of a side view of the force footprint of the tolerance ring on the outer surface of the pivot.

FIG. 8 shows a schematic view of the transmitted force footprint of the waves 12, 13, 15 to illustrate the above effect. FIG. 8 is a side view of the sleeveless pivot 50, with the outer races of the bearings 54, 56 and spacer element 58 exposed. In FIG. 8, the force footprints of the waves 12, 13, 15 are superimposed. Footprints 60, 62 are localised on a respective bearing 54, 56. These represent the force transmitted by the duplex wave 12, 13. Footprint 64 bridges between the bearings 54, 56 over the spacer element 58. This footprint represents the force transmitted by the bridging wave 15.

The invention claimed is:

1. Apparatus comprising an inner component, an outer component which mates with the inner component, and a tolerance ring located between the inner and outer components, the tolerance ring comprising a band having a plurality of radially extending projections around its circumference which are compressible between the inner and outer components, wherein the projections include a set of axially spaced protuberances circumferentially adjacent to an axially elongate protuberance, the axial extent of which spans the axial extent of the set of axially spaced protuberances; and the inner component comprises a plurality of axially adjacent subcomponents, each member of the set of axially spaced protuberances being arranged to transmit force to a respective subcomponent and the axially elongate protuberance being arranged to transmit force to a plurality of the sub-components.

2. Apparatus according to claim 1, wherein the inner component comprises a shaft that is receivable in a bore formed in a housing.

3. Apparatus according to claim 2, wherein the housing is an arm for a hard disk drive and the shaft is a pivot for that arm, the pivot comprising a pair of bearings which are separated from each other by a spacer element, the spacer element and bearings being arranged substantially contiguously to form an outer surface for receiving the tolerance ring.

4. Apparatus according to claim 3, wherein each member of the set of protuberances is arranged to transmit force to an outer race of a respective bearing, while the axially elongate protuberance is arranged to transmit force to the outer races of both bearings and the spacer element.

5. A pre-assembly arrangement for an apparatus comprising an inner component, an outer component which mates with the inner component, and a tolerance ring located between the inner and outer components, the pre-assembly comprising a tolerance ring securely mounted either on a shaft or within a bore, wherein the tolerance ring comprises a deformable band having a plurality of radially extending projections around its circumference, wherein the projections include a plurality of sets of axially spaced protuberances and axially elongate protuberances having a single protuberance, each set of axially spaced protuberances-is circumferentially adjacent to and alternating with respective single ones of axially elongate protuberances around the circumference of the band, and an axial extent of the single ones of the axially elongate protuberances spans an axial extent of the sets of axially spaced protuberances.

6. A method of assembling an apparatus comprising an inner component having a plurality of axially adjacent subcomponents, an outer component which mates with the inner component, and a tolerance ring located between the inner and outer components, the method including mounting a tolerance ring on either the inner or outer component, the tolerance ring comprising a band having a plurality of radially extending projections around its circumference, wherein the projections include a set of axially spaced protuberances circumferentially adjacent to an axially elongate protuberance, the axial extent of which spans the axial extent of the set of axially spaced protuberances; and mating the inner and outer components, thereby compressing the projections on the tolerance ring to provide an interference fit between the inner and outer components, such that each member of the set of axially spaced protuberances transmits force to a respective subcomponent, and the axially elongate protuberance transmits force to a plurality of the subcomponents.

* * * * *